United States Patent [19]

Hiraki et al.

[11] Patent Number: 4,828,779
[45] Date of Patent: May 9, 1989

[54] COATING METHOD

[75] Inventors: Yasuhito Hiraki; Yasunori Tanaka; Shinji Noda, all of Kanagawa, Japan

[73] Assignee: Fuji Photo Film Co., Ltd., Kanagawa, Japan

[21] Appl. No.: 920,495

[22] Filed: Oct. 20, 1986

[30] Foreign Application Priority Data

Oct. 18, 1985 [JP] Japan .................. 60-231091

[51] Int. Cl.⁴ .......................................... B29C 47/92
[52] U.S. Cl. ...................................... 264/171; 118/410;
118/411; 118/412; 264/216; 264/310; 427/127;
427/128
[58] Field of Search .................. 264/171, 310, 216;
427/127, 414, 128, 412.3; 425/224, 465–466;
118/410, 411, 412

[56] References Cited

U.S. PATENT DOCUMENTS

| 2,644,195 | 7/1953 | Bennes et al. | 264/37 |
|---|---|---|---|
| 3,063,095 | 11/1962 | Limbach | 425/376 R |
| 3,129,460 | 4/1964 | Berger | 425/381 |
| 3,217,358 | 11/1965 | Kihara | 425/376 A |
| 3,227,136 | 1/1966 | Bartlett et al. | 118/410 |
| 3,309,438 | 3/1967 | Bergstein et al. | 425/224 |
| 3,755,523 | 8/1973 | Straub et al. | 425/465 |
| 4,145,173 | 3/1979 | Pelzer et al. | 425/224 |
| 4,283,363 | 8/1981 | Boudenant et al. | 425/224 |
| 4,299,186 | 11/1981 | Pipkin et al. | 425/461 |
| 4,411,614 | 10/1983 | Feathers | 264/216 |
| 4,592,885 | 6/1986 | Ichino et al. | 425/224 |
| 4,623,501 | 11/1986 | Ishizaki | 425/461 |

FOREIGN PATENT DOCUMENTS

| 53-00260 | 1/1978 | Japan | 264/212 |
|---|---|---|---|
| 60-229726 | 10/1985 | Japan | 425/376 R |

Primary Examiner—Jeffery Thurlow
Attorney, Agent, or Firm—Sughrue, Mion, Zinn, Macpeak

[57] ABSTRACT

A method for uniformly coating a moving substrate by eliminating nonuniformities in the viscosity of the coating solution along the line where the solution is applied to the substrate. A viscosity-varying region is provided either inside or outside of a coating solution pocket in an extruder assembly. In one embodiment, the viscosity-varying region is provided by making the length of a slit through which the coating solution flows onto the support less than that of the pocket. In another embodiment, the viscosity-varying region takes the form of small-diameter tube through which the coating solution is supplied to one end of the pocket. In a third embodiment, a roller is disposed in the pocket and the diameter of the roller and the pocket are tapered towards the center. In a still further embodiment, the solution is supplied through a distributor.

8 Claims, 2 Drawing Sheets

FIG. 4
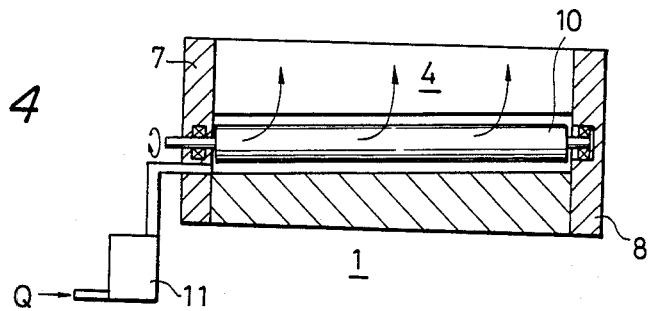
FIG. 5
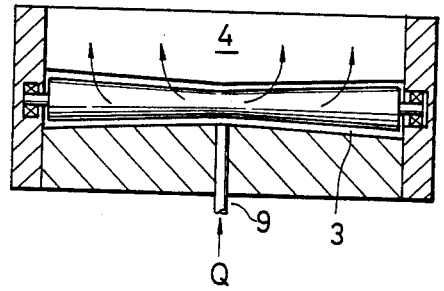
FIG. 6
| SPECIMEN NO. | 1 | 2 | 3 | 4 |
|---|---|---|---|---|
| THICKNESS IN WIDTHWISE DIRECTION | | | | |
| DIFFERENCE IN THICKNESS | 0.4 | 0.25 | 0.2 | 0.1μ OR LESS |

COATING METHOD

BACKGROUND OF THE INVENTION

The present invention relates to a method of coating a flexible support with a coating solution, and more particularly to a method of coating a flexible support with a magnetic solution to form a magnetic recording medium or the like.

The term "flexible support" as used herein is intended to mean a flexible sheet or web made of plastic film, paper, polyolefin-coated paper, or an aluminum or copper sheet. The flexible support may be one having a based coat. These flexible supports may be coated with magnetic solutions, photographing photosensitive coating solutions, and other coating solutions to form magnetic recording media, various photographing films, photographic papers, etc.

Heretofore a variety of coating methods, such as a roll coating method, a gravure coating method, a roll-coating-plus-doctoring method, an extrusion coating method, and a sliding bead coating method, have been employed to coat long flexible supports with coating agents.

Of these coating methods, the extrusion coating method has been extensively employed recently (see, Japanese Patent Application Publications Nos. 45528/1982 and 7306/1979, and Japanese Unexamined Published Patent Application (OPI) No. 189059/1983). A specific feature of the extrusion coating method resides in that a quantitative solution supplying pump capable of providing solution continuously at a predetermined flow rate is used to supply a magnetic-material-dispensed solution, namely, a coating solution, to the slit of the coating head, thereby coating the flexible support with the coating solution. However, the method is disadvantageous in that, in the widthwise direction of the support, the flow rate of the coating solution tends to change because of a loss of pressure in the slit, and accordingly the coat formed on the support is not uniform.

In order to solve this problem, a method has been proposed in the art in which, in the case where the coating solution has the properties of a Newtonian fluid, the slit is tapered in the widthwise direction to thus compensate for the loss of pressure in the slit. However, this method is not suitable for a magnetic layer coating solution because the magnetic layer coating solution greatly affects the electromagnetic conversion characteristics. That is, because the solution has a thixotropic nature, the viscosity of the coating solution changes in the pocket (coating solution pool) from which the coating solution is supplied to the slit of the coating head.

With respect to a coating solution such as a magnetic solution having a thixotropic nature, another method has been known in the art in which a rotary cylinder (or a rotor) is disposed in the pocket to shear the coating solution to thereby maintain the viscosity substantially constant in the widthwise coating direction.

In the case where the extrusion-type coating method is employed to coat a flexible support with a magnetic coating solution, in order to make the coat's thickness uniform in the widthwise direction, the above-described two methods may be employed in combination so that the viscosity in the widthwise direction is made substantially constant by the provision of the rotary cylinder in the pocket and the loss of pressure is compensated by tapering the slit in the widthwise direction.

The present inventors have found that the support still cannot be entirely uniformly coated with the coating solution even by employing these methods together, and thus have conducted intensive research on the cause of the nonuniform coating. As a result of this research, it has been found that the cause is that the pocket of the extrusion type coating apparatus is designed so that the part of the coating solution supplied into the pocket located near the solution supplying point is immediately extruded into the slit. That is, in the above-described conventional method, when the coating solution is supplied into the slit through the pocket, the coating solution near the solution supplying point (i.e., the coating solution receiving inlet) is delivered into the slit substantially without shearing by the rotor. Accordingly, in the coating solution flowing in the slit, the viscosity of the part of the coating solution which is near the solution supplying point of the pocket is different from the viscosities of the other parts. Thus, the coat on the support is not uniform in thickness.

The present invention have conducted more intensive research on the coating method and found that the above-described difficulties can be eliminated by the provision of a coating method according to the invention.

SUMMARY OF THE INVENTION

Accordingly, an object of this invention is to provide a coating method in which the above-described difficulties accompanying conventional coating method have been eliminated, and with which a coat formed on the support is excellent in quality and uniform in the widthwise direction.

Another object of the invention is to provide a method of applying a magnetic coating solution to a flexible support in which a coat formed on the support is uniform in the widthwise direction.

These and other objects have been achieved by providing a coating method using a extrusion type coating apparatus with an extruder having a slit forming a flow path directed towards a flexible support continuously run and located a short distance from a solution supply point, and a pocket communicated with the slit, and which is used to coat the flexible support with a coating solution which is continuously extruded from the end of the slit, said coating method comprising the steps of: providing a predetermined viscosity-varying region inside or outside the pocket, shearing the coating solution in the predetermined viscosity-varying region so that the viscosity of the coating solution is substantially equal to the final viscosity of the coating solution in the pocket, and supplying the coating solution thus treated to the part of the pocket which merges directly with the slit to coat the flexible support.

BRIEF DESCRIPTION OF THE DRAWINGS

FIGS. 3, 4 and 5 are also explanatory diagrams showing other embodiments of the invention; and FIG. 6 is a diagram showing test results of a specific example of the invention.

DESCRIPTION OF THE PREFERRED EMBODIMENTS

The invention will now be described in detail with reference to the accompanying drawings.

Figure 1:
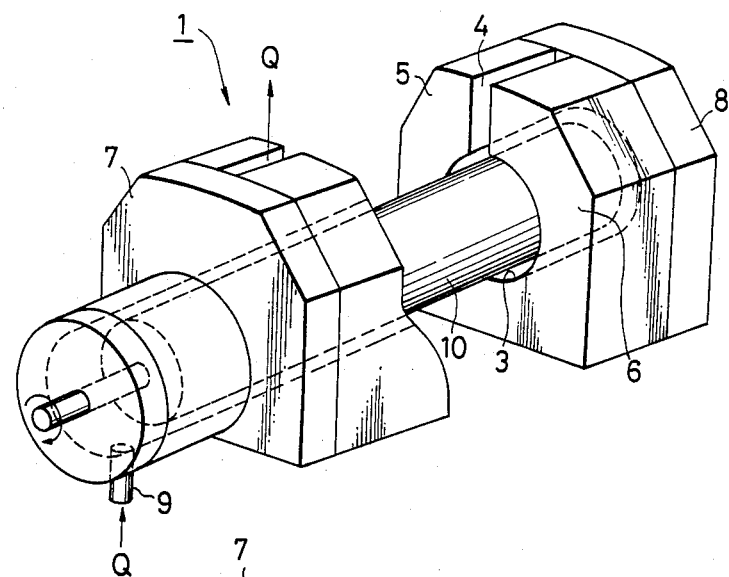
FIGS. 1 is a partially cut-away view showing an extruder assembly used in the practice of the invention.
Figure 2:
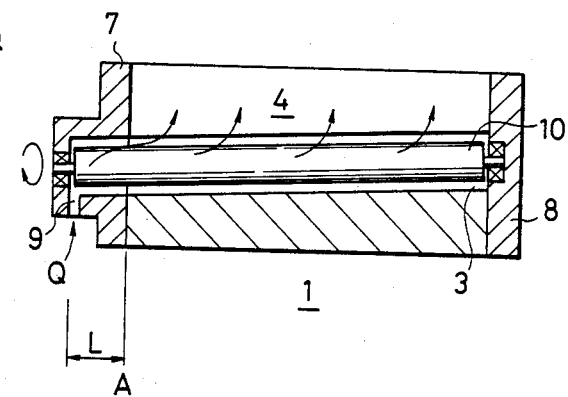
FIG. 2 is an explanatory diagram showing a preferred embodiment of the invention.

FIGS. 1 and 2 are explanatory diagrams showing an example of a coating method according to the invention. More specifically, FIGS. 1 and 2 show an extruder, which is an essential component of a coating apparatus for practicing the coating method according to the invention.

In the coating method of the invention, a coating solution Q is supplied by a solution supplying system having a quantitative solution supplying pump (not shown) provided outside the extruder 1 and which delivers the coating solution continuously at a predetermined flow rate. The extruder 1 is composed of a center block 5 (shown partially cut away) having a slit 4 and a cylindrical chamber 6 communicating with the slit 4, and two end plates 7 and 8. The coating solution Q flows into the extruder through a solution receiving inlet 9. The coating solution Q is sheared by a rotor 10 in an L-shaped region (a viscosity-varying region) formed by the rotor 10 and a pocket 3, which is longer than the coating width as shown in FIG. 2, so that the viscosity of the coating solution Q is made substantially equal to the final viscosity of the coating solution in the pocket 3 just before the coating solution reaches the end A of the slit 4, the width of which is substantially equal to the coating width. The length L is long enough to make the viscosity of the coating solution equal to the aforementioned final viscosity. Further, as shown in FIG. 2, the length of the flow path of the slit 4 extending between the pocket 3 and the end of the slit 4 is shorter at the side opposite the solution receiving inlet 9 such that a tapered flow path through the slit is formed.

The coating solution Q thus treated flows into the part of the pocket which is communicated directly with the slit 4, and is sheared in the gap defined by the pocket 3 and the rotating rotor 10 while flowing smoothly in the pocket 3. Thus, the coating solution is moved in the widthwise direction of the aforementioned support with the viscosity maintained at a predetermined value. The inside diameter of the pocket 3 is generally in a range of 10 mm to 100 mm, and the outside diameter of the rotor should be slightly smaller than the inside diameter of the pocket 3. The clearance between the pocket 3 and the rotor 10 is typically in a range of from 0.3 mm to 10 mm. The rotor is run at a speed of 10 to 1000 rpm.

The coating solution moving in the widthwise direction as described above passes through the slit 4, which has an opening 0.03 to 2 mm in width, and is applied in the form of a thin film onto the support, which is continuously run along the end of the slit. In this connection, in the slit 4, the flow path extending towards the support from the pocket 3 is short, being linear and/or curved. Therefore, the loss of pressure in the slit is compensated so that the distribution of flow rate is uniform in the widthwise direction; that is, a thin film coated uniformly in the widthwise direction is obtained. To achieve this, the coating solution Q should flow out of the pocket in the form of a laminar flow having a flow rate and a solution pressure distribution uniform in the widthwise direction of the support. The flow properties are greatly affected by various conditions such as the composition, physical properties, flow rate and supplying solution pressure of the coating solution Q. However, even if these conditions change, in the coating method of the invention, the support can be satisfactorily coated with the coating solution Q by adjusting the opening width, the length, and the degree of taper of the slit.

Figure 3:
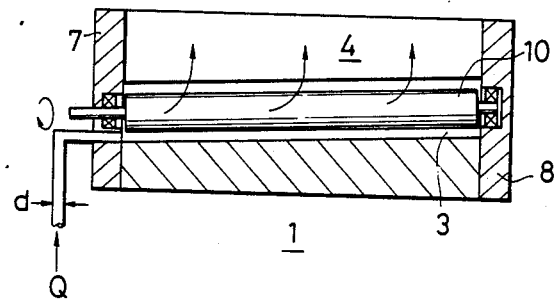

FIGS. 3 and 4 show other examples of a coating method according to the invention, mainly illustrating the viscosity-varying region. The flow path length through the slit 4 is tapered as in FIGS. 1 and 2.

In the first example of the coating method shown in FIGS. 1 and 2, the viscosity of the coating solution is made equal to the final viscosity by shearing the coating solution with the rotor 10 in a part of the pocket. On the other hand, in the second example of the inventive coating method shown in FIG. 3, the coating solution is sheared by passing the coating solution through a long thin pipe having a predetermined diameter d at a coating solution supplying section located outside the pocket 3. The diameter of the pie is determined with respect to the flow rate so that a shearing force substantially equal to that applied to the coating solution in the pocket is applied to the coating solution.

FIG. 4 depicts ta third example of a coating method according to the invention. In this embodiment, the viscosity-varying region is provided outside the pocket. In the coating method of FIG. 4, a distributor 11 or a dual pipe assembly is provided immediately before the pocket 3 so that the visocisty of the coating solution supplied to the pocket 3 is made equal to the final viscosity of the coating solution in the pocket 3.

FIG. 5 shows a modification of the system of supplying the coating solution to the pocket 3.

The system according to FIG. 5 is a so-called "central coating-solution supplying system" in which a solution supplying nozzle 9 is located substantially at the center of the extruder 1. In this system, the length of the flow path of th slit 4 extending towards the support is shorter towards both ends of the pocket 3 from the central solution supplying nozzle. Therefore, the pocket 3 is in the form of a cylinder tapering from its two ends towards it center. The rotor has the same general shape so that the same shearing force is applied to the coating solution at all points in the pocket. The degree of taper of the rotor 10 is determined by the peripheral speed of the rotor along its length and the clearance between the pocket 3 and the rotor 10. In this system, the viscosity-varying region is formed according to the illustration of FIGS. 3 and 4.

In the embodiments of the coating methods depicted in FIGS. 3, 4 and 5, the pocket 3 communicates along its entire length with the slit.

A specific example of the coating method according to the invention will be described; however, it should be noted that the invention is not limited thereto or thereby.

In this example, an extruder as shown in FIG. 1 was used to apply a magnetic layer coating solution having the following composition to the support to demonstrate the effects of the invention:

| Magnetic layer coating solution | |
|---|---|
| Co containing magnetic iron oxide ($S_{BET}$ 35 m$^2$/g) | 100 parts |
| Nitrocellulose | 10 parts |
| Polyurethane resin | 8 parts |
| (Trade name "Nipporan" 2304") | |
| Polyisocyanate | 8 parts |
| $Cr_2O_3$ | 2 parts |
| Carbon black (average grain size 20 μm) | 2 parts |
| Steraic acid | 1 part |

| Magnetic layer coating solution | |
|---|---|
| Butyl stearate | 1 part |
| Methylethylketone | 300 parts |

The magnetic layer coating solution having the above-described composition was applied to the support under the following conditions:

1. Support
Material: polyethylene terephthalate
Thickness: 20 μm
Width: 500 mm
Speed: 100 m/min
2. Extruder
Slot opening width: 0.5 mm
Solution pool diameter: 50 mm
Rotor diameter: 45 mm
3. Thickness of the coated film after drying: 5 μm.

The coating operation was carried out with the above-described extruder with the other conditions changed as shown in the following Table:

TABLE

| Condition | Specimen No. | | | |
|---|---|---|---|---|
| | 1 | 2 | 3 | 4 |
| L part length (mm) | 0 | 0 | 0 | 50 |
| Slit length (part A) | 30 | 30 | 30 | 30 |
| Degree of taper (%) | 0 | 5 | 5 | 5 |
| Rotor Speed (rpm) | 0 | 0 | 200 | 200 |

The results are as indicated in FIG. 6.

According to the invention, a magnetic film uniform in thickness in the widthwise direction of the support can be formed on a support. Furthermore, the difficulty of the magnetic film being displaced sidewardly while the support is being wound is overcome, providing a product of improved quality. As the support is coated with the coating solution stably according to the invention, productivity is remarkably improved.

Examples of various methods of the invention of coating the support with the coating solution uniformly in the widthwise direction of the support have been described. The support can be sufficiently uniformly coated with the coating solution in its widthwise direction with these methods. However, various other methods may be employed to allow the coating solution to flow smoothly in the pocket. For instance, a method may be used in which a small quantity of coating solution is drawn from the pocket through the ends. Alternatively, a method may be employed in combination in which, as disclosed by Japanese Patent Application (OPI) No. 143866/1985, a closed circulation system is used to draw and circulate the coating solution.

Many other alternatives and modifications to the above-described embodiments can be easily made within the scope of the invention defined by the appended claims.

What is claimed is:

1. In a coating method using an extrusion type coating apparatus with an extruder for extruding a coating solution having a slit forming a flow path facing a continuously run flexible support disposed a short distance from a solution supply point, a pocket having a width defined between two end plates and communicating with said slit, a rotary shearing means disposed in said pocket to shear the coating solution, said method comprising the steps of:

(a) providing a predetermined viscosity-varying region;
    (b) shearing said coating solution ins aid viscosity-varying region so that the viscosity of said coating solution is substantially equal to the final viscosity of said coating solution in said pocket;
    (c) supplying said coating solution thus treated to a part of said pocket which merges directly with said slit;
    (d) further shearing said coating solution by rotating said rotary shearing means about an axis aligned with the slit in said pocket; and
    (e) continuously extruding said coating solution from an exit end of said slit to coat said flexible support.

2. The coating method of claim 1, wherein said viscosity-varying region is provided by extending said pocket beyond said slit.

3. The coating method of claim 1, wherein said viscosity-varying region is provided outside of said pocket.

4. The coating method of claim 1, wherein said step of providing said viscosity-varying region comprises extending said pocket width beyond said slit and extending said rotary shearing means into said extended pocket.

5. The coating method of claim 3, wherein said step of providing said viscosity-varying region comprises supplying said solution to said slit through a tube having a diameter determined so as to make said viscosity of said coating solution substantially equal to said final viscosity of said coating solution in said pocket.

6. The coating method of claim 1, wherein said rotary shearing means comprises a rotary cylinder and said step of further shearing said coating solution comprises rotating said rotary cylinder in said pocket.

7. The coating method of claim 6, wherein said solution supply point is adjacent to a center portion of said pocket, said rotary cylinder and said pocket having a diameter tapering to said center portion of said pocket.

8. The coating method of claim 1, wherein the length of the flow path of said slit extending between said pocket and the exit end of the slit decreases from said solution supply point over the remaining width of said pocket.

* * * * *